(12) United States Patent
Mehta et al.

(10) Patent No.: US 7,443,925 B2
(45) Date of Patent: Oct. 28, 2008

(54) PILOT AND DATA SIGNALS FOR MIMO SYSTEMS USING CHANNEL STATISTICS

(75) Inventors: Neelesh B. Mehta, Medford, MA (US); Fadel F. Digham, Minneapolis, MN (US); Andreas F. Molisch, Arlington, MA (US); Jinyun Zhang, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 1010 days.

(21) Appl. No.: 10/895,167

(22) Filed: Jul. 20, 2004

(65) Prior Publication Data

US 2006/0018402 A1    Jan. 26, 2006

(51) Int. Cl.
    *H04L 27/04*    (2006.01)
(52) U.S. Cl. .................................. 375/299; 375/267
(58) Field of Classification Search ................. 375/299, 375/267
    See application file for complete search history.

(56) References Cited

U.S. PATENT DOCUMENTS

2004/0178954 A1* 9/2004 Vook et al. ................. 342/383

OTHER PUBLICATIONS

J.-C. Guey, M. P. Fitz, M. R. Bell, and W.-Y. Kuo, "Signal design for transmitter diversity wireless communication systems over Rayleigh fading channels," *IEEE Trans. Commun.*, vol. 47, pp. 527-537, Apr. 1999.

G. J. Foschini and M. J. Gans, "On the limits of wireless communications in a fading environment when using multiple antennas," *Wireless Pers. Commun.*, vol. 6, pp. 311-335, 1998.

E. Telatar, "Capacity of multi-antenna Gaussian channels," *European Trans. Telecommun.*, vol. 10, pp. 585-595, 1999.

A. Goldsmith, S. A. Jafar, N. Jindal, and S. Vishwanath, "Capacity limits of MIMO channels," *IEEE J. Select. Areas Commun.*, vol. 21, pp. 684-702, Jun. 2003.

E. Visotsky and U. Madhow, "Space-time transmit precoding with imperfect feedback," *IEEE Trans. Inform. Theory*, vol. 47, pp. 2632-2639, Sep. 2001.

J. P. Kermoal et al., "A stochastic MIMO radio channel model with experimental validation," *IEEE J. Select. Areas Commun.*, pp. 1211-1226, 2002.

(Continued)

*Primary Examiner*—Temesghen Ghebretinsae
(74) *Attorney, Agent, or Firm*—Dirk Brinkman; Clifton D. Mueller; Gene V. Vinokur

(57) ABSTRACT

A method generates signals in a transmitter of a multiple-input, multiple-output wireless communications system. The transmitter includes $N_t$ transmit antennas. A transmit covariance matrix $R_t$ determined using statistical state information of a channel. The transmit covariance $R_t$ matrix is decomposed using transmit eigenvalues $\Lambda_t$ to obtain a transmit eigenspace $U_t$ according to $R_t = U_t \Lambda_t U_t^\dagger$, where $\dagger$ is a Hermitian transpose. A pilot eigenspace $U_p$ is set equal to the transmit eigenspace $U_t$. A $N_t \times T_p$ block of pilot symbols $X_p$ is generated from the pilot eigenspace $U_p$ and pilot eigenvalue $\Lambda_p$ according to $X_p = U_p \Lambda_p^{1/2}$. A data eigenspace $U_d$ is set equal to the transmit eigenspace $U_t$. In addition, a $N_t \times N_t$ data covariance matrix $Q_d$ is generated according to $U_d \Lambda_d U_d^\dagger$, where $\Lambda_d$ are data eigenvalues. A $N_t \times T_d$ block of data symbols is generated, such that an average covariance of each of the columns in the block of data symbols $X_d$ equals the data covariance matrix $Q_d$. The block of pilot and data symbols form the signals to be transmitted.

10 Claims, 2 Drawing Sheets

OTHER PUBLICATIONS

S. A. Jafar and A. Goldsmith, "Multiple-antenna capacity in correlated Rayleigh fading with channel covariance information," *To appear in IEEE Trans. Wireless Commun.*, 2004.

S. H. Simon and A. L. Moustakas, "Optimizing MIMO antenna systems with channel covariance feedback," *IEEE J. Select. Areas Commun.*, vol. 21, pp. 406-417, Apr. 2003.

B. Hassibi and B. M. Hochwald, "How much training is needed in multiple-antenna wireless links?," *IEEE Trans. Inform. Theory*, pp. 951-963, 2003.

D. Samardzija and N. Mandyam, "Pilot-assisted estimation of MIMO fading channel response and achievable data rates," *IEEE Trans. Sig. Proc.*, pp. 2882-2890, 2003.

T. Yoo and A. Goldsmith, "Capacity of fading MIMO channels with channel estimation error," *Allerton*, 2002.

T. L. Marzetta, "BLAST training: Estimating channel characteristics for high-capacity space-time wireless," in *Proc. 37th Annual Allerton Conf. Commun., Control, and Computing*, 1999.

T. Yoo, E. Yoon, and A. Goldsmith, "MIMO capacity with channel uncertainty: Does feedback help?," in *Submitted to Globecom*, 2004.

T. L. Marzetta and B. M. Hochwald, "Capacity of a mobile multiple-antenna communication link in Rayleigh flat fading," *IEEE Trans. Inform. Theory*, vol. 45, pp. 139-157, Jan. 1999.

T. P. Minka, "Old and new matrix algebra useful for statistics." MIT Media Lab note, 2000. Also available on the web at http://www.stat.cmu.edu/~minka/papers/matrix/minka-matrix.pdf.

S. A. Jafar and A. Goldsmith, "Transmitter optimization and optimality of beamforming for multiple antenna systems," *To appear in IEEE Trans. Wireless Commun.*, 2004.

E. Jorswieck and H. Boche, "Optimal transmission with imperfect channel state information at the transmit antenna array," *Wireless Pers. Commun.*, pp. 33-56, Oct. 2003.

E. Jorswieck and H. Boche, "Channel capacity and capacity-range of beamforming in MIMO wireless systems under correlated fading with covariance feedback," *To appear in IEEE Trans. Wireless Commun.*, 2004.

D. Asztely, "On antenna arrays in mobile communication systems: Fast fading and GSM base station receiver algorithms," Tech. Rep. IR-S3-SB-9611, Royal Institute of Technology, 1996.

\* cited by examiner

200

PILOT AND DATA SIGNALS FOR MIMO SYSTEMS USING CHANNEL STATISTICS

FIELD OF THE INVENTION

This invention relates generally to multiple transmit antenna systems, and more particularly to determining pilot and data signals for such systems.

BACKGROUND OF THE INVENTION

Multiple-input, multiple-output (MIMO) communications can significantly increase spectral efficiencies of wireless systems. Under idealized conditions, a capacity of the channel increases linearly with the number of transmit and receive antennas, Winters, "On the capacity of radio communication systems with diversity in a Rayleigh fading environment," IEEE Trans. Commun., vol. 5, pp. 871-878, June 1987, Foschini et al., "On the limits of wireless communications in a fading environment when using multiple antennas," Wireless Pers. Commun., vol. 6, pp. 311-335, 1998, and Telatar, "Capacity of multi-antenna Gaussian channels," European Trans. Telecommun., vol. 10, pp. 585-595, 1999.

The possibility of high data rates has spurred work on the capacity achievable by MIMO systems under various assumptions about the channel, the transmitter and the receiver. The spatial channel model and assumptions about the channel state information (CSI) at the transmitter (CSIT) and the receiver (CSIR) have a significant impact on the MIMO capacity, Goldsmith et al., "Capacity limits of MIMO channels," IEEE J. Select. Areas Commun., vol. 21, pp. 684-702, June 2003.

For most systems, the instantaneous CSIT is not available. For frequency division duplex (FDD) systems, in which forward and reverse links operate at different frequencies, instantaneous CSIT requires a fast feedback, which decreases spectral efficiency. For time division duplex (TDD) systems, in which the forward and reverse links operate at the same frequency, the use of the instantaneous CSIT is impractical in channels with small coherence intervals because the delays between the two links need to be very small to ensure that the CSIT, inferred from transmissions by the receiver, is not outdated by the time it is used.

These problems can be avoided by using covariance knowledge at the transmitter (CovKT). This is because small-scale-averaged statistics, such as covariance, are determined by parameters, such as angular spread, and mean angles of signal arrival. The parameters remain substantially constant for both of the links even in FDD or quickly-varying TDD systems. Therefore, such statistics can be directly inferred at the transmitter by looking at reverse link transmissions without the need for explicit feedback from the receiver. In cases where feedback from the receiver is available, such feedback can be done at a significantly slower rate and bandwidth given the slowly-varying nature of the statistics.

The use of covariance knowledge at the transmitter to optimize the transmitted data sequences, assuming an idealized receiver with perfect CSIR, has been described by Visotsky et al., "Space-time transmit precoding with imperfect feedback," IEEE Trans. Inform. Theory, vol. 47, pp. 2632-2639, September 2001, Kermoal et al., "A stochastic MIMO radio channel model with experimental validation," IEEE J. Select. Areas Commun., pp. 1211-1226, 2002, Jafar et al., "Multiple-antenna capacity in correlated Rayleigh fading with channel covariance information," to appear in IEEE Trans. Wireless Commun., 2004, Simon et al., "Optimizing MIMO antenna systems with channel covariance feedback," IEEE J. Select. Areas Commun., vol. 21, pp. 406-417, April 2003, Jorswieck et al., "Optimal transmission with imperfect channel state information at the transmit antenna array," Wireless Pers. Commun., pp. 33-56, October 2003, and Tulino et al., "Capacity of antenna arrays with space, polarization and pattern diversity," in ITW, pp. 324-327, 2003. Jul. 12, 2004.

However, in practical applications, the CSIR is imperfect due to noise during channel estimation.

MIMO capacity with imperfect CSIR is described for different system architectures, channel assumptions and estimation error models. Many theoretical systems have been designed for spatially uncorrelated ('white') channels. While these theoretical solutions give valuable insights, they do not correspond to the physical reality of most practical MIMO channels, Molisch et al., "Multipath propagation models for broadband wireless systems," Digital Signal Processing for Wireless Communications Handbook, M. Ibnkahla (ed.), CRC Press, 2004. In practical applications, the channel is often correlated spatially ('colored'), and the various transfer functions from the transmit antennas to the receive antennas do not change independent of each other.

For the case where the CSIT is not available and MMSE channel estimation is used at the receiver, pilot-aided channel estimation for a block fading wireless channel has been described by Hassibi et al., "How much training is needed in multiple-antenna wireless links?," IEEE Trans. Inform. Theory, pp. 951-963, 2003. They derive an optimal training sequence, training duration, and data and pilot power allocation ratio.

The problems with a mismatched closed-loop system have also been described, Samardzija et al., "Pilot-assisted estimation of MIMO fading channel response and achievable data rates," IEEE Trans. Sig. Proc., pp. 2882-2890, 2003 and Yoo et al., "Capacity of fading MIMO channels with channel estimation error," Allerton, 2002. A data-aided coherent coded modulation scheme with a perfect interleaver is described by Baltersee et al., "Achievable rate of MIMO channels with data-aided channel estimation and perfect interleaving," IEEE Trans. Commun., pp. 2358-2368, 2001.

Baltersee et al., analyze the achievable rate of a data-aided coherent coded modulation scheme with a perfect interleaver. Mutual information bounds for vector channels with imperfect CSIR are described by Medard, "The effect upon channel capacity in wireless communications of perfect and imperfect knowledge of the channel," IEEE Trans. Inform. Theory, pp. 933-946, 2000.

Others, in different contexts, state that orthogonal pilots are optimal, Guey et al., "Signal design for transmitter diversity wireless communication systems over Rayleigh fading channels," IEEE Trans. Commun., vol. 47, pp. 527-537, April 1999, and Marzetta, "BLAST training: Estimating channel characteristics for high-capacity space-time wireless," Proc. 37th Annual Allerton Conf. Commun., Control, and Computing, 1999.

Data covariance for spatially correlated channels, given imperfect CSIR, are described by Yoo et al., "MIMO capacity with channel uncertainty: Does feedback help?," submitted to Globecom, 2004. However, the imperfect channel estimation was modeled in an ad-hoc manner by adding white noise to the spatially white component of channel state. Therefore, that model is inappropriate for many applications.

Lower and upper bounds on capacity are described for spatially white channels, Marzetta et al., "Capacity of a mobile multiple-antenna communication link in Rayleigh flat fading," IEEE Trans. Inform. Theory, vol. 45, pp. 139-157, January 1999. Those systems do not assume any a priori training schemes for generating the CSIR, and serve as fundamental limits on capacity.

Prior art systems either do not exploit statistics knowledge completely to determine the pilot and data sequences, or either design only pilot or only data signals, but not both, and make idealized assumptions about the channel knowledge at the transmitter and/or the receiver.

In light of the problems with the prior art MIMO systems, it is desired to generate optimal pilot and data signals, even when the instantaneous and perfect channel state is unavailable at the transmitter and receiver.

SUMMARY OF THE INVENTION

The invention provides a method for generating pilot and data signals in a multiple-input, multiple-output (MIMO) communications system. In the system, the transmitter only has access to channel covariance statistics, while the receiver has access to instantaneous, albeit, imperfect channel state information (CSIR). The receiver can estimate the channel using a minimum mean square error estimator. No specific assumptions are made about the spatio-temporal processing of the signals at the receiver that determines what data are transmitted.

It is a goal of the invention to fully exploit covariance knowledge at the transmitter to generate optimal pilot and data signals that enhance data transmission rates achievable over wireless channels. The invention matches eigenspaces of the pilot and data signals to the eigenspace of the transmitter side covariance of the channel. The invention also makes the ranks of the pilot and data covariance matrices equal. The rank determines how many of the stationary eigenmodes of the matrix are used. Thereby, rank matching ensures that pilot power is not wasted on eigenmodes that are not used for data transmission and vice versa. Furthermore, the duration of training with pilot signals, in units of symbol durations, is equal to the rank. For example, if the rank is three, then the training duration is three pilot symbols long.

The invention can also assign powers to the different eigenmodes using numerical methods. Furthermore, the invention uses a simple uniform assignment of power to the pilot and data signals, which results in near-optimal performance. The invention also describes a relationship between the powers of the corresponding pilot and data eigenmodes that can simplify the complexity of the above numerical methods.

DETAILED DESCRIPTION OF THE PREFERRED EMBODIMENT

System Structure

Figure 1:
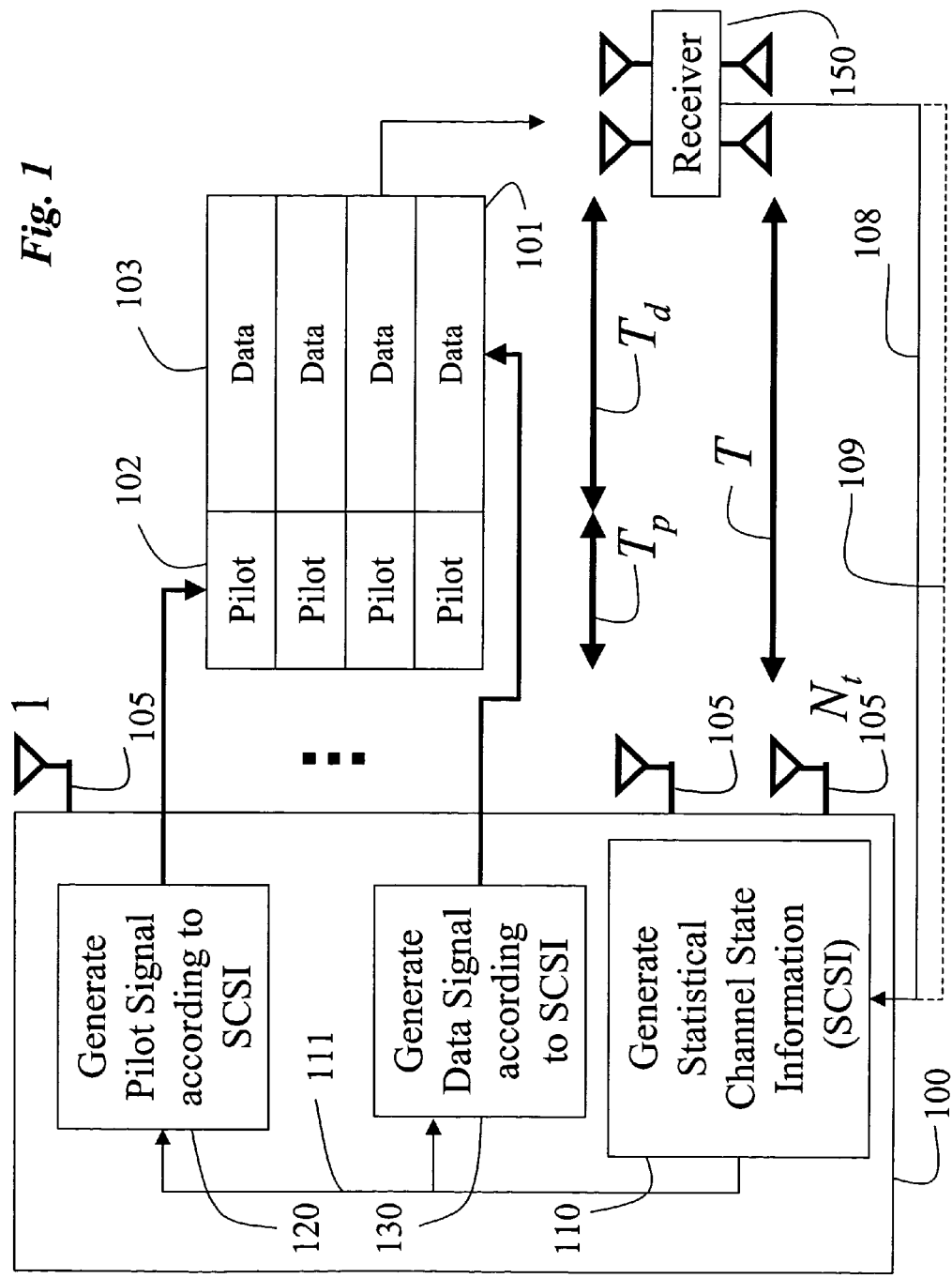
FIG. 1 is a block diagram of a transmitter according to the invention.

FIG. 1 is a transmitter 100 according to our invention for a multiple-input, multiple-output wireless communications system. The transmitter transmits a block of symbols 101 having a total duration T and a total power P. The block 101 includes pilot signals 102 having a duration $T_p$ and power $P_p$, and data signals 103 having a duration $T_d$ and power $P_d$, such that $T=T_p+T_d$, and $P=P_d+P_d$. In the block 101, each row corresponds to one of the $N_t$ transmit antennas.

The transmitter 100 includes multiple ($N_t$) antennas 105 for transmitting the pilot and data signals 101. The system 100 includes means 110 for determining statistical channel state information (SCSI) 111. By statistical information, we mean that we do not know the instantaneous state of the channel at that time the signals 101 are transmitted, which would be ideal. Instead, we only know how the state behaves statistically, when observed over a relatively long duration of time.

The statistics can be determined directly or indirectly. In the direct mode, a receiver 150 communicating with the transmitter supplies the SCSI in feedback messages 108 in response to transmitted signals, in a so called 'closed-loop' architecture. In the indirect mode, the SCSI is derived from signals 109 transmitted by the receiver 150, from time to time. The statistics are in the form of covariance matrixes described in greater detail below.

We use the SCSI to generate 120 the pilot signals and to generate 130 the data signals. More specifically, we use the SCSI to determine the signals to be transmitted, the duration $T_p$ for the pilot signals, and the power P allocated to the transmitted signals.

System Operation

Figure 2:
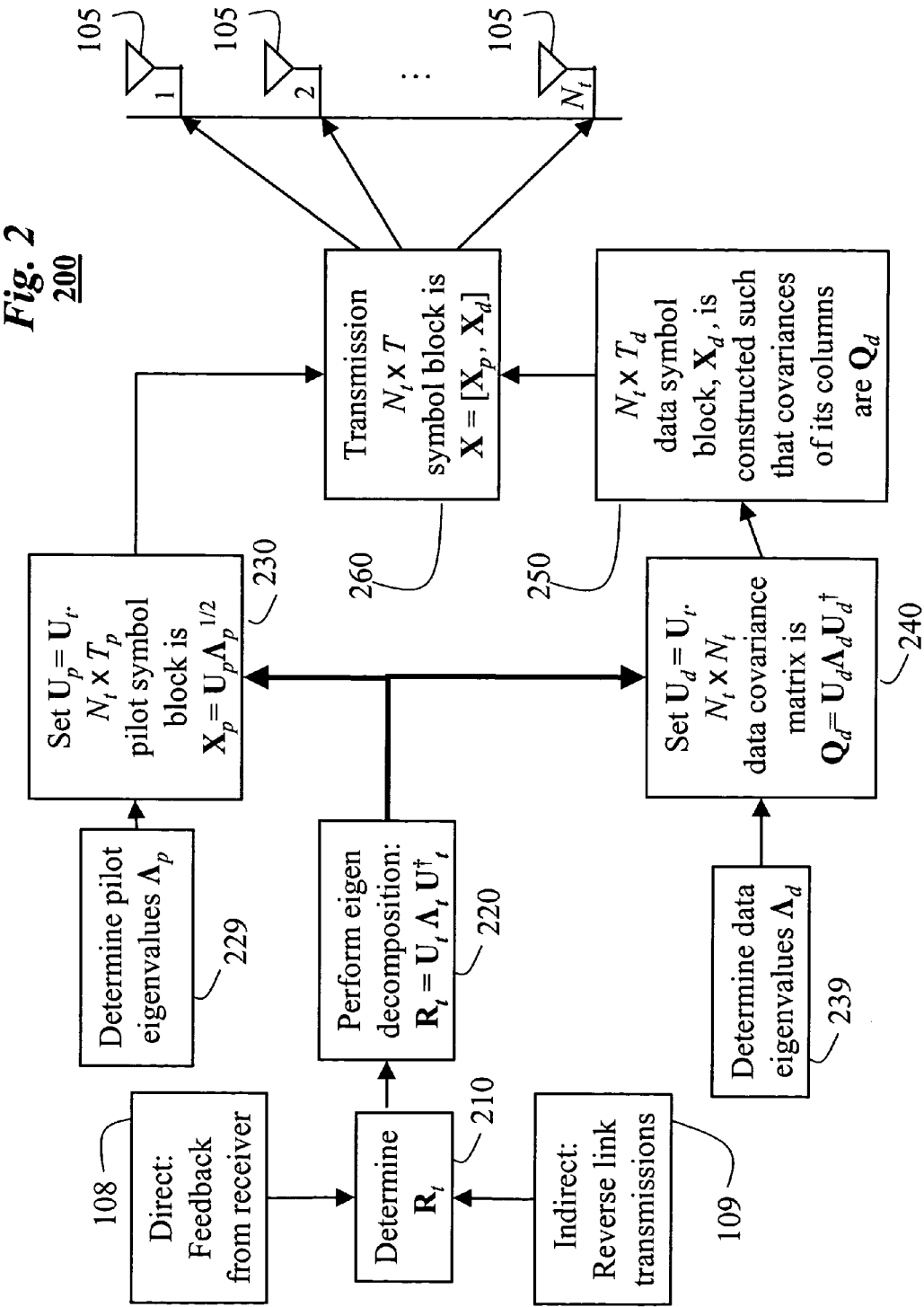
FIG. 2 is a flow diagram of a method for generating pilot and data signals according to the invention.

As shown in FIG. 2, the method 200 in the transmitter 100 determines 210 statistical channel state information directly from the feedback 108, or indirectly from reverse link transmissions 109. The SCSI is expressed in terms of a transmit covariance matrix $R_t$. Because our invention is independent of the receive covariance matrix, we set a receive covariance matrix equal $R_r$ to an identity matrix of size $N_r \times N_r$.

An eigen decomposition 220 is performed on the transmit covariance matrix $R_t$, using transmit eigenvalue $\Lambda_t$ to obtain a transmit eigenspace $U_t$ and its Hermetian transpose $U^\dagger_t$.

In the transmitter, pilot eigenvalues $\Lambda_p$ 229 for the pilot signals and data eigenvalues $\Lambda_d$ 239 for the data signals are determined. The eigenvalues are strictly based on the signal duration T and power P allocated to signal 101 to be transmitted. The eigenvalues can be determined beforehand using numerical search techniques or using near-optimal loading techniques that we describe below.

Using the result of the eigen decomposition 220, in step 230, a pilot eigenspace $U_p$ is set equal to the transmit eigenspace $U_t$. The pilot eigenspace $U_p$ and the pilot eigenvalue $\Lambda_p$ are used to generate the $N_t \times T_p$ block 102 of the pilot signals according to $X_p = U_p \Lambda_p^{1/2}$. In general, $X_p$ can also have an arbitrary right eigenspace $V_p$, thereby taking the general form $X_p = U_p \Lambda_p^{1/2} V_p^\dagger$.

In step 240, the data eigenspace $U_d$ is set equal to the transmit eigenspace $U_t$. The data eigenspace $U_t$ and the data eigenvalue $\Lambda_d$ are used to generate a $N_t \times N_t$ data covariance matrix $Q_d = U_d \Lambda_d U^\dagger_d$.

The result from step 240 is used in step 250 to generate the $N_t \times T_d$ block 103 of data signals, such that the covariances of all of the columns $\mathbb{E}[x_i x_i^\dagger]$ in the data symbol block are equal to the data covariance matrix $Q_d$, for $1 \leq i \leq T_d$.

The pilot symbol block and the data symbol block are combined in step 260 so that the $N_t \times T$ block for the signals 101 is $X = [X_p, X_d]$. The $N_t$ rows of the matrix X are fed to the $N_t$ antennas 105, row-by-row.

The detail of the transmitter structure and operation are now described in greater detail.

MIMO Channel Model

We consider a MIMO system with $N_t$ transmit antennas and $N_r$ receive antennas operating on a block fading frequency-flat channel model in which the channel remains constant for T time instants, and decorrelates thereafter. Each time instant is one symbol long. Of the T time instants, $T_p$ are used for transmitting pilot signals (pilot symbols), and the remaining $T_d = T - T_p$ time instants are used for data signals (data symbols). We use the subscripts p and d for symbols related to pilot and data signals, respectively. $P_p$ and $P_d$ denote the power allocated to pilot and data signals, respectively. Lower and upper case boldface letters denote vectors and matrices, respectively.

An $N_r \times N_t$ matrix H denotes an instantaneous channel state, where $h_{ij}$ denotes a complex fading gain from transmit antenna j to receive antenna i. Many channels can be represented by a covariance matrix expressed as a Kronecker product of the transmit and receive covariance matrices. The matrix H is $$H = R_r^{1/2} H_w R_t^{1/2}, \quad (1)$$

where $R_t$ and $R_r$ are the transmit and receive covariance matrices, respectively. The matrix $H_w$ is spatially uncorrelated, i.e., entries in the matrix are zero-mean, independent, complex Gaussian random variables (RVs) with unit variance. Furthermore, we assume that $R_r = I_{N_r}$, which is fulfilled when the receiver is in a rich scattering environment, e.g., the downlink of a cellular system or a wireless LAN system from an access point to a receiver. The receive covariance matrix $R_t$ is full rank.

Training Phase with Pilot Signals

A signal received during a training phase of duration of time $T_p$ is an $N_r \times T_p$ matrix $Y_p = [y_{ij}]$, where and entry $y_{ij}$ is the signal received at receive antenna i at time instant j. The matrix $Y_p$ is given by $$Y_p = H X_p + W_p, \quad (2)$$

where $X_p = [x_{ij}]$ is the transmitted pilot matrix 102 of size $N_t \times T_p$, which is known at the receiver. Here, $x_{ij}$ is the signal transmitted from transmit antenna i at time j. A spatially and temporally white noise matrix $W_p$ is defined in a similar manner. The entries of the matrix $W_p$ have variance $\sigma_w^2$.

Data Transmission

The noise vectors at different time instants are independent and identically distributed. Therefore, considering the capacity for block transmissions is equivalent to optimizing the capacity for vector transmissions. For any given time instant, the received vector, $y_d$, is related to the transmitted signal vector, $x_d$, by $$y_d = H x_d + w_d, \quad (3)$$

where $w_d$ is the spatially white noise vector. The vectors $y_d$, $x_d$, and $w_d$ have dimensions $N_r \times 1$, $N_t \times 1$, and $N_r \times 1$, respectively.

Other Notation

A parameter $\mathbb{E}_{\Gamma_1 | \Gamma_2}$ denotes an expectation over RV $\Gamma_1$ given $\Gamma_2$, where $(.)^\dagger$ is the Hermitian transpose, $(.)^t$ is the transpose, $(.)^{(k)}$ is the k×k principal sub-matrix that includes the first k rows and columns, $Tr\{.\}$ is the trace, |.| is the determinant, and $I_n$ denotes the n×n identity matrix.

$Q_d = \mathbb{E}_{x_d} [x_d x_d^\dagger]$ and $Q_p = X_p X_p^\dagger$ denote the data signal and pilot signal covariance matrices, respectively. Given that the pilot signal $X_p$ is a deterministic matrix, no expectation operator is used for defining $Q_p$.

Eigen decompositions of $Q_d$, $Q_p$, and $R_t$ are $Q_d = U^d \Lambda_d U^{\dagger}{}_d$, $Q_p = U_p \Lambda_p U^\dagger{}_p$, and $R_t = U_t \Lambda_t U^\dagger{}_t$, and the SVD of $X_p$ is $X_p = U_p \Sigma_p V^\dagger{}_p$. Note that $Q_d$, $Q_p$, and $R_t$ are all Hermitian matrices, i.e., they equal their Hermitian transposes. Also, $\Lambda_p = \Sigma_p \Sigma_p^\dagger$.

MMSE Channel Estimator

Given the covariance information and the pilot signals $X_p$, the MMSE channel estimator passes the received vector $y_d$ through a deterministic matrix filter to generate the channel estimate $\hat{H}$. For $R_r = I_{N_r}$, it can be shown that $$\hat{H} = Y_p (\mathbb{E}_{Y_p | X_p} [Y_p^\dagger Y_p])^{-1} \mathbb{E}_{H, Y_p | X_p} [Y_p^\dagger H]. \quad (4)$$

Substituting equation (2) into equation (4), and simplifying the results gives $$\hat{H} = Y_p A = (H X_p + W_p) A,$$

where the matrix filter A is given by $$A = (X_p^\dagger R_t X_p + \sigma_w^2 I_{T_p})^{-1} X_p^\dagger R_t. \quad (5)$$

As shown in Appendix A, $\hat{H}$ is statistically equivalent to $$\hat{H} = H_w \tilde{R}_t^{1/2}, \quad (6)$$

where $H_w$ is spatially white with its entries having a unit variance. $\tilde{R}_t$ is given by $$\tilde{R}_t = R_t X_p (X_p^\dagger R_t X_p + \sigma_w^2 I_{T_p})^{-1} X_p^\dagger R_t. \quad (7)$$

The above result shows that in general $\tilde{R}_t \neq R_t$, i.e., for an MMSE estimator, the estimation error also affects the transmit antenna covariance of the estimated channel $\hat{H}$, and cannot be modeled by mere addition of a spatially white noise to $H_w$, as is done in the prior art.

Capacity with Estimation Error

A channel estimation error is defined as $\Delta = H - \hat{H}$. From equation (3), it follows that data transmission is governed by $$y_d = \hat{H} x_d + \Delta x_d + w_d. \quad (8)$$

A lower bound of the capacity of the channel is obtained by considering a sub-optimal receiver that treats a term $e = \Delta x_d + w_d$ as Gaussian noise. The channel capacity is therefore lower bounded by $$C_\Delta = \left(1 - \frac{T_p}{T}\right) \mathbb{E}_{\hat{H}} \log_2 \left| I_{N_t} + \hat{H}^\dagger (\mathbb{E}_e [e e^\dagger])^{-1} \hat{H} Q_d \right|. \quad (9)$$

The factor $(1 - T_p/T)$ is a training penalty resulting from pilot transmissions, which transfer no information. Equation (6) implies that a distribution of $\hat{H}$ is left rotationally invariant, i.e., $\pi(\Theta \hat{H}) = \pi(\hat{H})$, where $\pi(.)$ denotes a probability distribution function, and $\Theta$ is any unitary matrix. It therefore follows that $C_\Delta$ is lower bounded further by $$C_\Delta \geq C_L = \left(1 - \frac{T_p}{T}\right) \mathbb{E}_{\hat{H}} \log_2 \left| I_{N_t} + \frac{1}{\sigma_w^2 + \sigma_I^2} \hat{H}^\dagger \hat{H} Q_d \right|, \quad (10)$$

where $$\sigma_I^2 = \frac{1}{N_r} Tr \{\mathbb{E}_{\Delta, x_d} [\Delta x_d x_d^\dagger \Delta^\dagger]\}.$$

As shown in Appendix B, $\sigma_I^2$ reduces to $$\sigma_I^2 = Tr\{Q_d (R_t - \tilde{R}_t)\}.$$

Optimal Pilot and Data Signals

We now desire to maximize the lower bound on the MIMO capacity $C_L$ with imperfect knowledge of the exact channel state information. This maximization problem can be stated as:

$$\max_{\substack{U_d, \Lambda_d, X_p \\ T_p}} \left(1 - \frac{T_p}{T}\right) \mathbb{E}_{\hat{H}} \log_2 \left| I_{N_t} + \frac{\hat{H}^\dagger \hat{H} Q_d}{\sigma_w^2 + \text{Tr}\{Q_d(R_t - \tilde{R}_t)\}} \right|, \quad (12)$$

subject to a total power/time constraint $P_p T_p + P_d T_d = PT$, where
$\text{Tr}\{Q_d\} = P_d$, $\text{Tr}\{X_p X_p^\dagger\} = P_p T_p$, and P is the total power.

We first state the following lemma.

Lemma 1:

If the matrices AB and BA are positive semi-definite, there always exists a permutation $\tau$ such that $\text{Tr}\{AB\} = \text{Tr}\{BA\} = \Sigma_i \sigma_i(A) \sigma_{\tau(i)}(B)$, where $\sigma_i(.)$ denotes the $i^{th}$ eigenvalue. The following theorem deals with just the self-interference term $\sigma_I^2$.

Theorem 1:

$$\min_{U_p, U_d} \sigma_I^2 = \min_{U_p, U_d} \text{Tr}\{Q_d(R_t - \tilde{R}_t)\} = \sigma_w^2 \sum_{i=1}^{k_p} \frac{\lambda_{d_i} \lambda_{t_i}}{\sigma_w^2 + \lambda_{t_i} \lambda_{p_i}}, \quad (13)$$

where $\lambda_{t_1} \geq \lambda_{t_2} \geq \ldots$, $\lambda_{d_1} \geq \lambda_{d_2} \ldots$, and $\lambda_{p_1} \geq \lambda_{p_2} \ldots$ Proof: In a sequence of inequalities that follow, we first arrive at a lower bound for $\sigma_I^2$, without commenting at each step, on the conditions required to achieve equality. At the very end, we show that equality is indeed achievable. Let $k_p$ denote the rank of the pilot symbol matrix $X_p$. First, we define the following matrices:

$$S_3 = U^\dagger \begin{bmatrix} \left((U\Lambda_t Y^\dagger)^{(k_p)} + \sigma_w^2 \Lambda_p^{(k_p)^{-1}}\right)^{-1} & 0 \\ 0 & 0 \end{bmatrix} U,$$

$$S_2 = \Lambda_t(I_{N_t} - S_3 \Lambda_t), \text{ and } S_1 = V S_2 V^\dagger,$$

where $U = U_p^\dagger U_t$ and $V = U_d^\dagger U_t$. As shown in Appendix C, $\sigma_I^2 = \text{Tr}\{\Lambda_d S_1\}$.

Therefore, $$\min_{U_p, U_d} \sigma_I^2 = \min_{U, V} \text{Tr}\{\Lambda_d S_1\} = \min_{\tau_1, U} \sum_i \sigma_i(\Lambda_d) \sigma_{\tau_1(i)}(S_1). \quad (14)$$

Given that $S_1$ and $S_2$ have the same eigenvalues, there exists a permutation $\tau_2$ such that $\sigma_i(S_1) = \sigma_{\tau_2(i)}(S_2)$. The following step eliminates V.

$$\min \text{Tr}\{\Lambda_d S_1\} = \min_{\tau_3 = \tau_2 \circ \tau_1} \sum_i \sigma_i(\Lambda_d) \sigma_{\tau_3(i)}(S_2) = \min \text{Tr}\{\Lambda_d S_2\}. \quad (15)$$

Simplifying further, $\min \text{Tr}\{\Lambda_d S_1\} = \min \text{Tr}\{\Lambda_d S_2\} = \text{Tr}\{\Lambda_d \Lambda_t\} - \max(\text{Tr}\{\Lambda_d \Lambda_t^2 S_3\}$. We only need to maximize $\text{Tr}\{\Lambda_t^2 \Lambda_d S_3\}$. We define $$U = \begin{bmatrix} U^{(k_p)} & D \\ E & F \end{bmatrix} \text{ and } \Lambda_t = \begin{bmatrix} \Lambda_t^{(k_p)} & 0 \\ 0 & \Lambda_t^{(rest)} \end{bmatrix}.$$

As shown in Appendix D, $$\text{Tr}\{\Lambda_d \Lambda_t^2 S_3\} \leq \text{Tr}\{S_4^{-1}\}, \quad (16)$$

where $$S_4 = \Lambda_d^{(k_p)^{-1}} \Lambda_t^{(k_p)^{-1}} (I_{k_p} + \sigma_w^2 U^{(k_p)^{-1}} \Lambda_p^{(k_p)^{-1}} U^{(k_p)^{-1}} \Lambda_t^{(k_p)^{-1}}), \quad (17)$$

and equality occurs when $U^{(k_p)}$ is unitary. Note that $S_4$ is independent of D.

Using matrix algebra, we know that $$\frac{\partial \text{Tr}\{S_4^{-1}\}}{\partial U^{(k_p)}} = S_4^{-2} \frac{\partial \text{Tr}\{S_4\}}{\partial U^{(k_p)}}.$$

Given that $S_4$ is invertible, this implies that the extrema of $\text{Tr}\{S_4\}$ and $\text{Tr}\{S_4^{-1}\}$, at which the partial derivatives equal 0, are identical. Given that $U^{(k_p)}$ is unitary, Lemma 1 implies that the extrema of $\text{Tr}\{S_4\}$ occur when $U^{(k_p)}$ is a diagonal unitary permutation matrix. After substituting in equation (16), the identity permutation $U^{(k_p)} = I_{k_p}$ can be shown to maximize $\text{Tr}\{\Lambda_d \Lambda_t^2 S_3\}$.

Therefore, $$\sigma_I^2 \geq \text{Tr}\{\Lambda_d \Lambda_t\} - \sum_{i=1}^{k_p} \frac{\lambda_{t_i} \lambda_{d_i}}{1 + \sigma_w^2 \lambda_{p_i}^{-1} \lambda_{t_i}^{-1}} = \sigma_w^2 \sum_{i=1}^{N_t} \frac{\lambda_{d_i} \lambda_{t_i}}{\sigma_w^2 + \lambda_{t_i} \lambda_{p_i}}. \quad (18)$$

Finally, equality is verified by substituting $U_p = U_d = U_t$ in $\text{Tr}\{Q_d(R_t - \tilde{R}_t)\}$. Let the eigen decomposition of $R_t$ be $\tilde{U}_t \tilde{\Lambda}_t \tilde{U}_t^\dagger$.

The optimal pilot and data signal generation, according to the invention that maximizes $C_L$ follows.

Theorem 2:

$C_L$ satisfies an upper bound:

$$C_L(\Lambda_d, U_d, X_p) \leq \quad (19)$$

$$\left(1 - \frac{T_p}{T}\right) \mathbb{E}_{\hat{H}_w} \log_2 \left| I_{N_t} + \frac{\tilde{H}_w^\dagger \tilde{H}_w \tilde{\Lambda}_t \Lambda_d}{\sigma_w^2 + \sigma_w^2 \sum_{i=1}^{N_t} \frac{\lambda_{t_i} \lambda_{d_i}}{\sigma_w^2 + \lambda_{p_i} \lambda_{t_i}}} \right|.$$

Furthermore, the upper bound is achieved when $U_d = U_p = U_t = \tilde{U}_t$, and, therefore, constitutes an optimal solution.

Proof: $C_L$ is a function of $Q_d = U_d \Lambda_d U_d^\dagger$, and $X_p = U_p \Sigma_p V_p^\dagger$, which affects $R_t$. Starting from equation (12), the following sequence of inequalities holds true.

$$C_L(\Lambda_d, U_d, X_p) = \left(1 - \frac{T_p}{T}\right) \mathbb{E}_{\hat{H}} \log_2 \left| I_{N_t} + \frac{\tilde{H}_w^\dagger \tilde{H}_w \tilde{R}_t^{1/2} Q_d \tilde{R}_t^{1/2\dagger}}{\sigma_w^2 + Tr\{Q_d(R_t - \tilde{R}_t)\}} \right|, \quad (20)$$

$$\leq \left(1 - \frac{T_p}{T}\right) \mathbb{E}_{\hat{H}} \log_2 \left| I_{N_t} + \frac{\tilde{H}_w^\dagger \tilde{H}_w \tilde{R}_t^{1/2} Q_d \tilde{R}_t^{1/2\dagger}}{\sigma_w^2 + \min_{U_d, U_p} Tr\{Q_d(R_t - \tilde{R}_t)\}} \right|,$$

$$= \left(1 - \frac{T_p}{T}\right) \mathbb{E}_{\hat{H}} \log_2 \left| I_{N_t} + \frac{\tilde{H}_w^\dagger \tilde{H}_w \tilde{R}_t^{1/2} Q_d \tilde{R}_t^{1/2\dagger}}{\sigma_w^2 + \sigma_w^2 \sum_{i=1}^{N_t} \frac{\lambda_{d_i} \lambda_{t_i}}{\sigma_w^2 + \lambda_{p_i} \lambda_{t_i}}} \right|. \quad (21)$$

Equation (21) follows from Theorem 1. Remember that $Tr\{Q_d\} = Tr\{\Lambda_d\} = P_d$. Given that the denominator is independent of $U_d$, then, for the same data power $P_d$, the formula for $C_L$ in equation (21) is maximized, and thereby, upper bounded, by the case $U_d = \tilde{U}_t$. Substituting this in equation (21) leads to equation (19).

The last step is to verify that equality is achievable. This can be done by substituting $U_p = U_d = U_t = \tilde{U}_t$ in the formula for $C_L$.

The proof for Theorem 2 obtains consecutive upper bounds by first minimizing the denominator and then independently maximizing the numerator. In general, the optimizing arguments responsible for the two optimizations need not be the same. However, we have shown above that the two optimizing arguments are indeed the same in our set up. After eigenspace matching, $$A_t = \Lambda_t^2 \Lambda_p (\Lambda_t \Lambda_p + \sigma_w^2 I_{T_p})^{-1}. \quad (22)$$

We now investigate the rank properties of the optimal $Q_d$ and $Q_p$. Let $k_d$ and $k_p$ denote the ranks of $Q_d$ and $Q_p$, respectively.

Theorem 3:

The data signal and the pilot signal covariance matrices $Q_d$ and $Q_p$ are of the same rank to maximize the channel capacity $C_L$.

Proof: The proof is in Appendix E.

The next theorem determines the optimal training duration.

Theorem 4:

The channel capacity $C_L$ is maximized when $T_p = k_p = k$.

Proof: The proof is in Appendix F.

This implies that the optimal training duration $T_p$, in terms of pilot symbols, can indeed be made less than $N_t$ given CovKT. This duration is a function of the transmit eigenvalues $\Lambda_t$, and the total power P. Moreover, given that $k = k_d \leq \min(N_t, N_r)$, the following is an important corollary for transmit diversity systems in which the number of receive antennas is less than the number of transmit antennas, i.e., $N_r < N_t$.

Corollary 1:

$T_p \leq \min(N_t, N_r)$.

In summary, for the system under consideration, the data and pilot sequences satisfy the following properties:

(a) The eigenspaces $U_t = U_p = U_d = \tilde{U}_t$ all match; and
(b) The ranks match, i.e., $\text{rank}(Q_d) = \text{rank}(Q_p) = k$ match, and
(c) The training duration, in units of symbol durations, need only equal the rank k.

For a given rank k, the $N_t - k$ eigenvectors of $Q_d$ and $Q_p$ corresponding to the zero eigenvalues are irrelevant.

The eigenvalues of the covariance matrices $Q_d$ and $Q_p$, namely $\Lambda_d$ and $\Lambda_p$, and thereby $P_d$, $P_p$, and k, depend on P, T, and $\Lambda_t$, and are optimized numerically.

These conditions according to the invention, combined with a simple expressions for $C_L$ and $A_t$, drastically reduce the search space to determine all the optimal parameters, and make the numerical search feasible.

Sub-Optimal Embodiments

We now focus on the pilot and data loading ($\Lambda_p$ and $\Lambda_d$) and show how their computation can be simplified considerably.

Pilot Signal Loading to Minimize Self-Interference $\sigma_I^2$

First, we first consider the power loading for the pilot signal that minimizes the self-interference noise term $\sigma_I^2$. This results in a closed-form relationship between the loading for the data and pilot signals. As shown in Appendix G, the solution to a self-interference minimization problem $\min_{\Lambda_p} \sigma_I^2$, subject to the constraint $Tr\{\Lambda_p\} = P_p T_p$ is $$\lambda_{pi} = \left(\mu \sqrt{\lambda_{di}} - \frac{\sigma_w^2}{\lambda_{ti}}\right)^+, \quad 1 \leq i \leq k \quad (23)$$

where $$\mu = \frac{P_p T_p + \sigma_w^2 \sum_{i=1}^{k} \lambda_{ti}^{-1}}{\sum_{i=1}^{k} \sqrt{\lambda_{di}}} \quad (24)$$

and $(.)^+$ denotes $\max(., 0)$.

Maximizing the denominator, without taking the numerator into account, need not maximize $C_L$ because this ignores the dependence of $A_t$ on $\Lambda$. However, the above interrelationship halves the number of unknowns and serves as a good starting point for the numerical optimization routines that determine the optimal pilot and data eigenvalues $\Lambda_p$ and $\Lambda_d$.

Minimizing $\sigma_I^2$ with respect to $\Lambda_d$ is not of interest as this results in a degenerate k=1 transmit diversity solution for all $P_d$.

Uniform Selective Eigenmode Loading

We consider a scheme that allocates equal power to all the eigenmodes in use for data and pilot signals (symbols). The number of eigenmodes used and the ratio of powers allocated to pilots and data signals are numerically optimized. Note that the optimization is over two variables: $1 \leq k \leq N_t$ and $\alpha$, and is considerably simpler.

The capacity achieved by the uniform selective eigenmode loading scheme is within 0.1 bits/sec/Hz of the optimal $C_L$ for all P and $\sigma_\theta$, and several $N_r$ and $N_t$ values. While this result is expected for higher P or when the eigenvalues of $R_t$ are similar, the near-optimal performance for all P and $\sigma_\theta$ is not obvious. The answer lies in the loading of the data signal at the transition points when additional eigenmodes are turned on.

Effect of the Invention

The invention provides a method for determining the pilot and data signals in multiple-input, multiple-output communications systems where channel knowledge is imperfect at the receiver and partial channel knowledge, such as covariance knowledge, is available at the transmitter.

The invention also provides for power loading of the pilot and data signals. The invention exploits covariance knowledge at the transmitter to generate the pilot and data signals. The case where channel state information at the receiver is acquired using a pilot-aided MMSE channel estimation is described.

An optimal embodiment of the invention was considered. The invention uses an analytically tractable lower bound on the ergodic channel capacity, and shows that the lower bound is maximized when the eigenspaces of the covariance matrices of the pilot and data signals match the eigenspaces of the transmit covariance matrix $R_t$. Furthermore, it is sufficient to transmit the data signals over only those eigenmodes of $R_t$ that are allocated power during training.

Indeed, the optimal training duration can be less than the number of transmit antennas, and equal to the number of eigenmodes used for data transmission. For small angular spreads, our system with covariance knowledge and imperfect CSIR, outperforms prior art systems with perfect CSIR but without any covariance knowledge. The results obtained by the invention are in contrast to the results obtained without assuming any channel knowledge, even statistical, at the transmitter; then the optimal $U_p$ was $I_{N^t}$, and the optimal $T_p$ is always $N_t$.

For larger angular spreads, imperfect CSIR negates the benefits that accrue by using covariance knowledge. Uniform power loading over the eigenmodes used for data transmission and training achieves near-optimal performance for all values of interest of angular spread and power. This behavior is unlike the prior art case of perfect CSIR and perfect instantaneous CSIT, where conventional water-filling is optimal and markedly outperforms uniform power loading at low SNR for small angular spreads.

The invention provides an explicit relationship between pilot and data signal eigenmode power allocations to minimize self-interference noise due to imperfect estimation.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

APPENDICES

A. Statistically Equivalent Representation of $\hat{H}$

From (4) and the Kronecker model for H in (1), we have $\hat{H}=H_w R_t^{1/2} X_p A + W_p A$. Let $\hat{h}_i$, $r_i$, and $w_i$ denote the i th rows of $\hat{H}$, $H_w$, and $W_p$, respectively. They are related by $$\hat{h}_i = r_i R_t^{1/2} X_p A + w_i A. \quad (25)$$

Given that $w_i$ and $r_i$ are uncorrelated, the rows of $\hat{H}$ are uncorrelated:

$$\mathbb{E}_{\hat{h}_i,\hat{h}_j}[\hat{h}_i^\dagger \hat{h}_j]=0, (i \neq j). \quad (26)$$

When i=j, the correlation is given by $$\mathbb{E}_{\hat{h}_i}[\hat{h}_i^\dagger \hat{h}_i] = A^\dagger X_p R_t^{1/2\dagger} \mathbb{E}_{r_i}[r_i^\dagger r_i] R_t^{1/2} X_p A + A^\dagger \mathbb{E}_{w_i}[w_i^\dagger w_i] A, \quad (27)$$

$$= A^\dagger (X_p^\dagger R_t X_p + \sigma_w^2 I_{T_p}) A, \quad (28)$$

$$= \tilde{R}_t, \text{ for all } i. \quad (29)$$

Eqn. (28) follows from (27) because $\mathbb{E}_{r_i}[r_i^\dagger r_i]=I_{N_t}$ and $\mathbb{E}_{w_i}[w_i^\dagger w_i]=\sigma_w^2 I_{N_t}$. Combining (26) and (29), yields the desired result.

B. Formula for $\sigma_I^2$

The expression for $\sigma_I^2$ can be simplified as follows:

$$\sigma_I^2 = \frac{1}{N_r} Tr\{\mathbb{E}_{x_d,\Delta}[\Delta x_d x_d^\dagger \Delta^\dagger]\}, \quad (30)$$

$$= \frac{1}{N_r} Tr\{\mathbb{E}_\Delta[\Delta^\dagger \Delta] Q_d\},$$

$$= \frac{1}{N_r} Tr\{\mathbb{E}_{H,\hat{H}}[H^\dagger H - \hat{H}^\dagger H] Q_d\},$$

$$= \frac{1}{N_r} Tr\{R_t^{1/2\dagger} \mathbb{E}_{H_w}[H_w^\dagger H_w] R_t^{1/2} - \mathbb{E}_{H,\hat{H}}[\hat{H}^\dagger H] Q_d\}, \quad (31)$$

$$\sigma_I^2 = \frac{1}{N_r} Tr\{(N_r R_t - N_r A^\dagger X_p^\dagger R_t) Q_d\}. \quad (32)$$

Eqn. (30) follows from the orthogonality property of linear estimation error, $\mathbb{E}_{\Delta,\hat{H}}[\Delta^\dagger \hat{H}]=0$.

Eqn. (31) simplifies because $\mathbb{E}_{H_w}[H_w H_w^{\dagger H}]=N_r I_{N_t}$. The desired expression in (11) follows from the expression for $R_t$ derived in (7), and the fact that $R_t$ is Hermitian.

Appendices

C. Simplifying $\sigma_I^2 = Tr\{Q_d(R_t - \tilde{R}_t)\}$

In terms of the SVD of $X_p = U_p \Sigma_p V_p^\dagger$, $\tilde{R}_t$ can be written as $$\tilde{R}_t = R_t U_p \Sigma_p (\Sigma_p^\dagger U_p^\dagger R_t U_p \Sigma_p + \sigma_w^2 I_{T_p})^{-1} \Sigma_p^\dagger U_p^\dagger R_t. \quad (33)$$

In general, the rank, $k_p$, of $\Sigma_p$ is less than $N_t$. Therefore, $$\sum_p = \begin{bmatrix} \sum_p^{(k_p)} & 0 \\ 0 & 0 \end{bmatrix},$$

where $\Sigma_p^{(k_p)}$ is invertible. Substituting this in (33) and then moving $\Sigma_p^{(k_p)}$ inside the inverse, yields $$\tilde{R}_t = R_t U_p \begin{bmatrix} \left((U_p^\dagger R_t U_p)^{(kp)} + \sigma_w^2 \Lambda_p^{(kp)-1}\right)^{-1} & 0 \\ 0 & 0 \end{bmatrix} U_p^\dagger R_t.$$

Therefore, $$Tr\{Q_d(R_t - \tilde{R}_t)\} =$$
$$Tr\left\{Q_d R_t \left(I_{N_t} - U_p \begin{bmatrix} ((U_p^\dagger R_t U_p)^{(k_p)} + \sigma_w^2 \Lambda_p^{(k_p)-1})^{-1} & 0 \\ 0 & 0 \end{bmatrix} U_p^\dagger R_t \right)\right\}.$$

Expressing $R_t$ in terms of its SVD, consolidating and rearranging terms, finally results in $$\sigma_t^2 = \tag{34}$$
$$Tr\left\{\Lambda_d V \Lambda_t \left(I_{N_t} - U^\dagger \begin{bmatrix} ((U\Lambda_t U^\dagger)^{(k_p)} + \sigma_w^2 \Lambda_p^{(k_p)-1})^{-1} & 0 \\ 0 & 0 \end{bmatrix} U \Lambda_t \right) V^\dagger \right\},$$

where $U = U_p^\dagger U_t$ and $V = U_d^\dagger U_t$.

D. Simplifying $Tr\{\Lambda_d \Lambda_t^2 S_3\}$

After block matrix multiplications, $(U\Lambda_t U^\dagger)^{(k_p)} = U^{(k_p)} \Lambda_t^{(k_p)} U^{(k_p)\dagger} + D\Lambda_t^{(rest)} D^\dagger$. Hence, $Tr\{\Lambda_d \Lambda_t^2 S_3\} = Tr\{\Lambda_d^{(k_p)} \Lambda_t^{(k_p)2} U^{(k_p)\dagger}[U^{(k_p)} \Lambda_t^{(k_p)} U^{(k_p)\dagger} + D\Lambda_t^{(rest)} D^\dagger + \sigma_w^2 \Lambda_p^{(k_p)-1}]^{-1} U^{(k_p)}\}$. Moving $U^{(k_p)\dagger}$, $U^{(k_p)}$, and $\Lambda_t^{(k_p)}$ into the inverse[7], we get $$Tr\{\Lambda_d \Lambda_t^2 S_3\} = Tr\{\Lambda_d^{(k_p)} \Lambda_t^{(k_p)} [I_{k_p} + \sigma_w^2 U^{(k_p)-1} \Lambda_p^{(k_p)-1} U^{(k_p)\dagger-1} \Lambda_t^{(k_p)-1} + GJ^{-1}]\},$$

where G is positive semi-definite. Removing G cannot decrease the trace. Therefore, the desired eqns. (16) and (17) follow.

[7] $U^{(k_p)}$ is invertible because U is unitary.

APPENDICES

E. Data and Pilot Rank Matching

Let $k_p = \text{rank}(\Lambda_p)$ and $k_d = \text{rank}(\Lambda_d)$. Let $k = \min(k_d, k_p)$ From (22), it can be seen that $\text{rank}(A_t \Lambda_d) = k$. Therefore, $A_t \Lambda_d$ is of the form $$\tilde{\Lambda}_t \Lambda_d = \begin{bmatrix} \tilde{\Lambda}_t^{(k)} \Lambda_d^{(k)} & 0 \\ 0 & 0 \end{bmatrix}.$$

Given the eigenspace matching result from Thm. 2, $C_L$ simplifies to $$C_L = \left(1 - \frac{T_p}{T}\right) E_{\tilde{H}_w} \log_2 \left| I_k + \frac{(\tilde{H}_w^\dagger \tilde{H}_w)^{(k)} \tilde{\Lambda}_t^{(k)} \Lambda_d^{(k)}}{\sigma_w^2 + Tr\{\Lambda_t^{(k_d)} \Lambda_d^{(k_d)}\} - Tr\{\tilde{\Lambda}_t^{(k)} \Lambda_d^{(k)}\}} \right|. \tag{35}$$

The above equation implies that the $N_t - k$ weakest eigen values of $\Lambda_p$, namely, $\lambda_{p_{k+1}}, \ldots, \lambda_{PN_t}$ play no role in the capacity expression. They must be set to 0 to conserve energy for the pilots for the modes in use. Hence, $k_p \leq k$.

We now show that any scenario other than $k = k_p = k_d$ is sub-optimal. If $k_p > k_d$, then $k = \min(k_p, k_d) = k_d$. But, $k_p \leq k$ from the arguments above. Therefore, this case is impossible. If $k_d > k_p$, $k = k_p$. Allocating any power to the data eigenmodes $\lambda_{d_{k+1}}, \ldots, \lambda_{dN_t}$ does not affect the numerator, $(H_w^\dagger H_w)^{(k)} A_t^{(k)} \Lambda_d^{(k)}$, in (35), while it increases the denominator (noise) term $Tr\{\Lambda_t^{(k_d)} \Lambda_d^{(k_d)}\}$. Hence, this case is also sub-optimal.

APPENDICES

F. Optimal Training Duration

From Thm. 3, we know that $T_p \geq k_p = k$. Let a value of $T_p$ strictly greater than k be optimal, with data and pilot covariance matrices $\Lambda_d^o$ and $\Lambda_p^o$, respectively.[8]

[8] Setting $V_p = I_{T_p}$ does affect $R_t$ and $C_L$ and shows that having $T_p > k$ is equivalent to not transmitting any pilot power in the last $T_p - k$ slots allocated for training. The proof shows that this is sub-optimal.

Now consider the case where the pilots are transmitted over just $T_p - 1$ time instants with the same pilot covariance matrix $\Lambda_p = \Lambda_p^o$, while the data is now transmitted for one more time instant. To satisfy the total energy constraint, the new data covariance matrix is set to $\Lambda_d = \beta \Lambda_d^o$, where $$\beta = \frac{T - T_p}{T - T_p + 1} < 1.$$

While the data is now transmitted for a longer duration, the rate achieved per transmission is reduced due to lower power. We now show that, for a given data power $P_d$ used when the training time was $T_p$, the difference between the two capacities, $f(P_d) = T[C(T_p - 1) - C(T_p)]$, is positive. $f(P_d)$ can be written as $$f(P_d) = (T - T_p + 1) \mathbb{E}_D \left[\log_2 \left| I_{N_t} + \frac{P_d \beta D}{\sigma_w^2 + P_d \beta \delta_1} \right|\right] - \tag{36}$$
$$(T - T_p) \mathbb{E}_D \left[\log_2 \left| I_{N_t} + \frac{P_d D}{\sigma_w^2 + P_d \delta_1} \right|\right],$$

where $D = H_w^\dagger H_w A_t^o \overline{\Lambda}_d^o$ and $$\delta_1 = \sum_{i=1}^{N_t} (\lambda_{t_i} - \tilde{\lambda}_{t_i}) \overline{\lambda}_{d_i}^o > 0.$$

Here, $$\overline{\Lambda}_d^o = \frac{1}{P_d} \Lambda_d^o$$

denotes the power normalized $\Lambda_d^o$ and is independent of $P_d$; $\overline{\lambda}_i^{d\,o}$ is its ith diagonal element.

We first show that $$\frac{df}{dP_d} > 0.$$

The derivative of the determinant of an arbitrary matrix M is given by $$\frac{d|M|}{dx} = |M| Tr\left\{M^{-1} \frac{dM}{dx}\right\}.$$

It can then be shown that $$\frac{df}{dP_d} = \mathbb{E}_D[Tr\{(T-T_p+1)(I_{N_t} + \frac{P_d\beta}{\sigma_w^2+\beta P_d\delta_1}D)^{-1}D\}]\frac{\beta\sigma_w^2}{\ln(2)(\sigma_w^2+\beta P_d\delta_1)^2} -$$
$$\mathbb{E}_D[Tr\{(T-T_p)(I_{N_t} + \frac{P_d}{\sigma_w^2+P_d\delta_1}D)^{-1}D\}]\frac{\sigma_w^2}{\ln(2)(\sigma_w^2+P_d\delta_1)^2},$$
$$> \frac{\sigma_w^2(T-T_p)}{\ln(2)(\sigma_w^2+P_d\delta_1)^2}E_D\left[Tr\left\{\left(I_{N_t} + \frac{\beta P_d}{\sigma_w^2+P_d\beta\delta_1}D\right)^{-1} -\right.\right.$$
$$\left.\left.\left(I_{N_t} + \frac{P_d}{\sigma_w^2+P_d\delta_1}D\right)^{-1}\right\}\right]$$

The last step follows because $$\frac{(\sigma_w^2+P_d\delta_1)^2}{(\sigma_w^2+\beta P_d\delta_1)^2} > 1 \text{ if } \beta < 1.$$

Using the relation $$Tr\{(I_{N_t}+qD)^{-1}D\} = \sum_{i=1}^{N_t}\frac{\lambda_{D_i}}{1+q\lambda_{D_i}}, \quad (q \geq 0),$$

and simplifying gives $$\frac{df}{dP_d} > \frac{\sigma_w^2(T-T_p)}{\ln(2)(\sigma_w^2+P_d\delta_1)^2}\mathbb{E}_D\left[\sum_{i=1}^{N_t}\frac{\lambda_{D_i}^2(a(1)-a(\beta))}{(1+a(\beta)\lambda_{D_i})(1+a(1)\lambda_{D_i})}\right], \quad (37)$$

where $\alpha(\beta) = \beta P_d/(\sigma_w^2+\beta P_d\delta_1)$.

Given that $\alpha(\beta) < \alpha(1) < 1$, each of the terms in (37) is positive. We therefore get $$\frac{df}{dP_d} > 0.$$

Notice that as $P_d \to 0$, $\lim_{P_d \to 0}$ of $f(P_d) = 0$. This along with $$\frac{df}{dP_d} > 0$$

implies that $f(P_d) > 0$. This shows that any $T_p > k$ is necessarily sub-optimal.

APPENDICES

G. $\Lambda_d$ and $\Lambda_p$ Relationship for Minimizing $\sigma_l^2$

₺From Thm. 1, we know that $$\min_{U_p, U_d} \sigma_l^2 = \sigma_w^2 \sum_{i=1}^{k}\frac{\lambda_{d_i}\lambda_{t_i}}{\sigma_w^2+\lambda_{t_i}\lambda_{p_i}}. \quad (38)$$

Minimizing the above formula with respect to $\lambda_{p1}, \ldots, \lambda_{pk}$, subject to the trace constraint $$\sum_{i=1}^{k}\lambda_{pi} = P_pT_p,$$

is equivalent to maximizing the Lagrangian $$g = \sigma_w^2\sum_{i=1}^{k}\frac{\lambda_{d_i}\lambda_{t_i}}{\sigma_w^2+\lambda_{t_i}\lambda_{p_i}} + \delta\left(\sum_{i=1}^{k}\lambda_{p_i} - P_pT_p\right), \quad (39)$$

where $\delta$ is the Lagrange multiplier. Solving for $$\frac{\partial g}{\partial \lambda_{p_j}} = 0$$

results in (23). Substituting (23) in the trace constraint gives (24).

We claim:

1. A method for generating signals in a transmitter of a multiple-input, multiple-output wireless communications system, the transmitter including $N_t$ transmit antennas, comprising:
   determining a transmit covariance matrix $R_t$ based on statistical state information of a channel;
   decomposing the transmit covariance $R_t$ matrix using transmit eigenvalues $\Lambda_t$ to obtain a transmit eigenspace $U_t$ according to $R_t = U_t\Lambda_t U^{\dagger}_t$, where † is a Hermitian transpose;
   setting a pilot eigenspace $U_p$ equal to the transmit eigenspace $U_t$; and
   generating a $N_t \times T_p$ block of pilot symbols $X_p$ from the pilot eigenspace $U_p$ and pilot eigenvalue $\Lambda_p$ according to $X_p = U_p\Lambda_p^{1/2}$.

2. The method of claim 1, in which the pilot eigenvalues are based strictly on a signal duration T and a power P allocated to transmitted signals.

3. The method of claim 1, in which the block of pilot symbols $X_p$ has an arbitrary right eigenspace $V_p$, thereby taking a general form $X_p = U_p\Lambda_p^{1/2}V_p^{\dagger}$.

4. The method of claim 1, further comprising:
   setting a data eigenspace $U_d$ equal to the transmit eigenspace $U_t$;
   generating a $N_t \times N_t$ data covariance matrix $Q_d$ according to $U_d\Lambda_d U^{\dagger}_d$, where $\Lambda_d$ are data eigenvalues; and
   generating a $N_t \times T_d$ block of data symbols, such that an average covariance of each of the columns in the block of data symbols $X_d$ equals the data covariance matrix $Q_d$.

5. The method of claim 4, further comprising:
   combining the block of pilot symbols and the block of data symbols, such that $X = [X_p, X_d]$; and
   transmitting each of $N_t$ rows of the matrix X to a different one of the $N_t$ antennas.

6. The method of claim 4, further comprising:
   setting rank of a pilot covariance matrix $Q_p$ equal to a rank of the data covariance matrix $Q_d$ to maximize a capacity of the channel.

7. The method of claim 6, in which the channel capacity is maximized when a number of pilot signals $T_p$ is equal to the rank.

8. The method of claim 7, in which $T_p \leq \min(N_t, N_r)$, where $N_r$ is a number of receive antennas.

9. The method of claim 2, further comprising:
   allocating equally power to all eigenmodes used for the data symbols and the pilot symbols.

10. The method of claim 9, in which a number of eigenmodes used and a ratio of power allocated to the pilot symbols and the data symbols are optimized numerically.

* * * * *